Sept. 12, 1961     O. E. BLAIR     2,999,493
DIAMOND DRESSING TOOL
Filed May 26, 1960
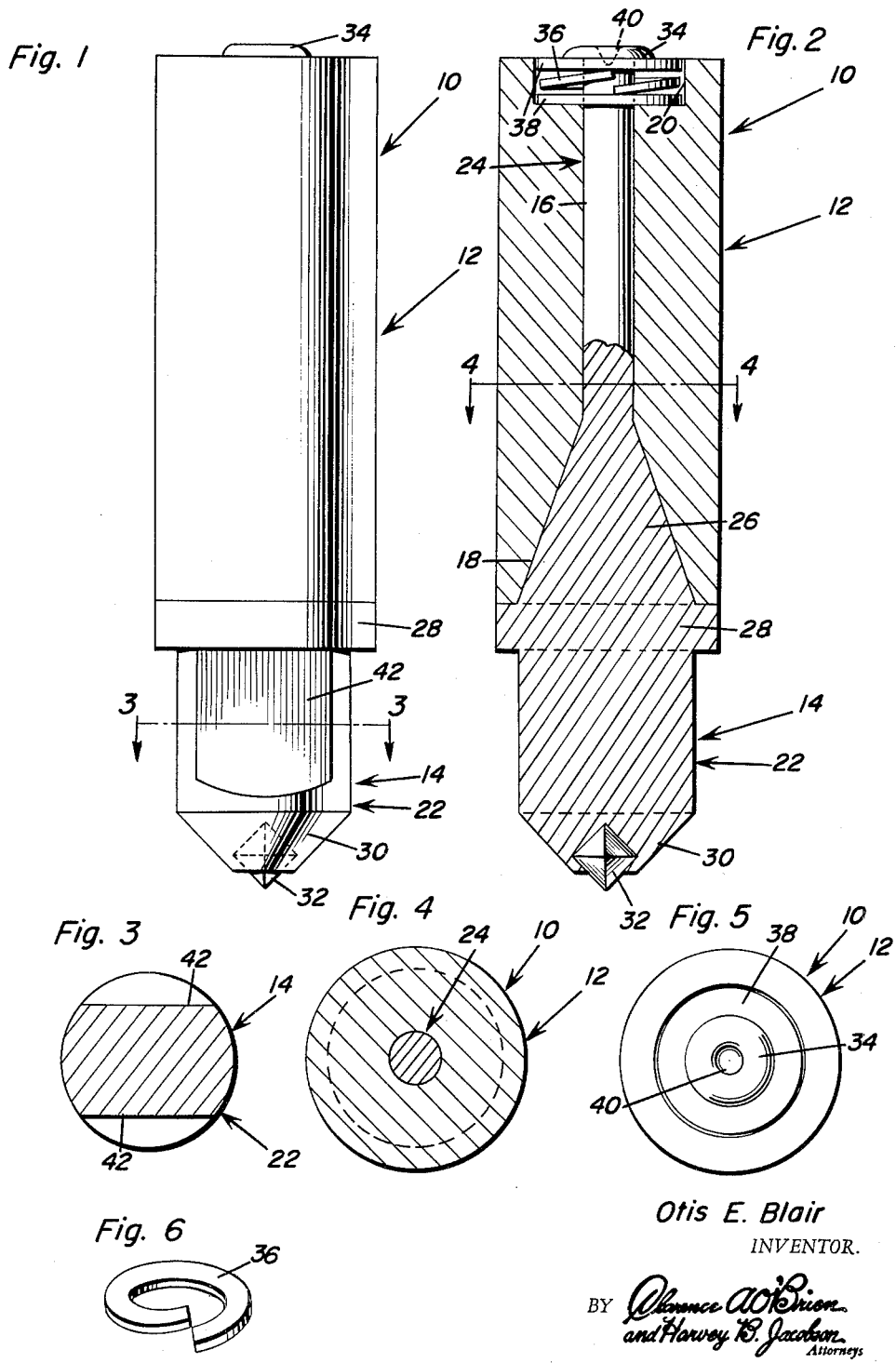
Otis E. Blair
INVENTOR.

United States Patent Office 2,999,493
Patented Sept. 12, 1961

2,999,493
DIAMOND DRESSING TOOL
Otis E. Blair, West Orange, N.J., assignor to The Staset Company, Inc., West Orange, N.J., a corporation of New Jersey
Filed May 26, 1960, Ser. No. 31,999
4 Claims. (Cl. 125—39)

This invention relates to a novel and useful diamond dressing tool, and more particularly to a diamond headed dressing tool including a sleeve adapted to be rigidly secured within a holder and an elongated diamond headed cutting tool rotatably journaled through the sleeve with the diamond cutting element thereof aligned with the axis of rotation of the cutting tool whereby the latter may be constantly or intermittently rotated relative to the sleeve in order to substantially increase the life of the diamond cutting element thereof.

Although it is common procedure to provide a diamond cutting tool including a tool member rotatably mounted in order to extend the life of the diamond cutting element of the tool, the present invention resides in the provision of a means for increasing friction between the rotatably associated parts of the cutting tool while simultaneously providing a means for constantly compensating for wear occurring between the surfaces of the tool in frictional engagement with each other.

Heretofore diamond cutting tools of the rotating type have included the provision of a sleeve member having a cylindrical axial bore formed therethrough and a tool member having a cylindrical shank rotatably journaled in the sleeve. Although axle members and their journals can be quite economically produced with close tolerances, there is necessarily some play between a cylindrical bore and a cylindrical shaft rotatably journaled therein and even this minimum amount of play is undesirable in the production of a precision diamond cutting tool inasmuch as the diamond of the tool must be rigidly mounted to perform its cutting action with a high degree of accuracy and proficiency.

The present invention includes the provision of a sleeve portion provided with a cylindrical bore having an inwardly tapering conical bore at one end and a tool member having a cylindrical shank portion rotatably received in the axial bore and a tapered conical portion seated within the tapered counterbore of the sleeve member with a means provided for resiliently urging the conical portion into tight seated frictional engagement with the tapered counterbore of the sleeve member. In this manner, the abutting surfaces of the conical portion of the tool member and the tapered counterbore of the sleeve member serve to ensure that the tool member will be maintained against lateral movement relative to the sleeve and the resilient means for urging the tool member into tight frictional engagement with the sleeve member ensures that any wear occurring between the conical surfaces of the tool and sleeve members will be automatically and constantly compensated for.

It is the main object of this invention to provide a cutting tool having a rotatable tool member journaled for rotation in a manner whereby lateral deflection of the tool member relative to its journaling member will be eliminated.

A further object of this invention, in accordance with the immediately preceding object, is to provide a means whereby sufficient friction is provided between the tool member and the sleeve member to maintain the tool member in rotated positions relative to the sleeve member during cutting operations unless positive torque is applied to the tool member to effect its rotation.

Yet another object of this invention, in accordance with the preceding object, is to provide a means whereby wear occurring between the confronting surfaces of the sleeve and tool members in frictional engagement with each other may be constantly and automatically compensated for.

A still further object of this invention, in accordance with the immediately preceding object, is to provide a means whereby the frictional engagement between the confronting surfaces of the sleeve and tool members may be increased as desired.

A final object to be specifically enumerated herein is to provide a diamond grinding tool which will conform to conventional forms of manufacture, be of simple construction and easy to operate and maintain in efficient operation so as to provide a device that will be economically feasible, long lasting and well suited for its intended purpose.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a side elevational view of the diamond grinding tool comprising the present invention;

FIGURE 2 is a vertical sectional view taken substantially upon a plane passing through the center of the diamond grinding tool.

FIGURE 3 is a transverse horizontal sectional view taken substantially upon the plane indicated by the section line 3—3 of FIGURE 1;

FIGURE 4 is a transverse horizontal sectional view taken substantially upon the plane indicated by the section line 4—4 of FIGURE 2;

FIGURE 5 is a top plan view of the diamond grinding tool; and

FIGURE 6 is a perspective view of the spring means utilized to maintain the conical portion of the cutting tool in tight frictional engagement with the inwardly tapered counterbore of the tool sleeve.

Referring now more specifically to the drawings the numeral 10 generally designates the diamond dressing tool comprising the present invention which includes a sleeve generally referred to by the reference numeral 12 and an elongated cutting tool generally referred to by the reference numeral 14.

The sleeve 12 is generally cylindrical and is provided with an axial bore 16 provided with an inwardly tapered counterbore 18 at one end and a cylindrical counterbore 20 at the other end. The elongated cutting tool includes a diametrically enlarged end head portion generally referred to by the reference numeral 22 and a cylindrical shank end portion generally referred to by the reference numeral 24. A conical bearing intermediate portion 26 is disposed between the end portions 22 and 24 and a diametrically enlarged and radially extending shoulder portion 28 is formed on the head portion 22 adjacent the conical bearing intermediate portion 26. The shank portion 24 is rotatably journaled in the axial bore 16 with the conical bearing intermediate portion 26 seated in frictional engagement with the complementary surfaces of the inwardly tapered counterbore 18. It will further be noted that the shoulder portion 28 abuts against the end of the sleeve 12 remote from the counterbore 20.

The diametrically enlarged head end portion 22 includes a frusto-conical end portion 30 remote from the shoulder portion 28 and a diamond cutting element 32 is centrally disposed in and carried by the end portion 30.

The cylindrical shank end portion 24 remote from the conical bearing intermediate portion 26 terminates in a diametrically enlarged end portion 34 and a compression spring or washer 36 is disposed between the confronting surfaces of the end portion 34 and the counterbore 20.

A pair of friction washers 38 are disposed between the ends of the spring 36 and the confronting surfaces of the end portion 34 and the counterbore 20.

The end surface of the end portion 34 remote from the shank 24 is provided with a centrally disposed and inwardly tapered recess 40 for engagement by an implement if it is desired to permanently increase the effective tension of the spring 36. An impact implement is seated in the recess 40 in order to flare the end portion 34 to increase the tension of the spring 36.

With attention now directed more particularly to FIGURE 1 of the drawings it will be noted that the diametrically enlarged head end portion 22 is provided with a pair of diametrically opposed flats 42 for engagement by a tool to effect rotation of the cutting tool 14.

In normal operation, the sleeve 12 is rigidly secured in a holder and the tool 10 may then be used for various types of cutting operations. If it is desired to rotate the cutting tool 14, the tool may be engaged with the diametrically opposed flats 42 to effect rotation of the cutting tool 14. The spring 36 yieldably urges the conical bearing intermediate portion into tight frictional engagement with the inwardly tapered counterbore 18 and also the shoulder portion 28 into tight frictional engagement with the end of the sleeve 12 remote from the counterbore 20. In this manner, the cutting tool 14 is maintained in tight frictional engagement with the sleeve 12 to yieldably resist rotation relative thereto and the cutting tool 14 is maintained against lateral movement relative to the sleeve 12 by means of the wedging action of the conical bearing intermediate portion seated within the inwardly tapered counterbore 18.

It is to be noted that the enlarged head portion 22 is sufficiently large to enable the use of a complete range of diamond weight cutting elements and also the use of a cluster or multitude of diamonds of various weights as is required in cluster or multipoint diamond tools.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A diamond tool comprising a sleeve adapted to be rigidly secured within a holder, an axial bore formed through said sleeve having an inwardly tapered counterbore at one end, an elongated cutting tool having a diametrically enlarged head end portion and a cylindrical shank end portion at the other end, a conical bearing intermediate portion tapering toward said shank end portion and disposed between the latter and said head end portion, said shank portion rotatably received in said axial bore with said conical bearing portion seated in said counterbore, a centrally disposed cutting tool carried at the end of said head portion remote from said shank portion, and means interconnected between said sleeve and cutting tool resiliently urging said intermediate portion into tight frictional engagement with said counterbore, said urging means including spring means secured between the end of said shank portion remote from said head portion and the end of said sleeve remote from said tapered counterbore, a counterbore formed in said end of said axial bore remote from said tapered counterbore, said spring means disposed in said second mentioned counterbore, a diametrically enlarged end portion on said shank remote from said intermediate portion, said diametrically enlarged end portion projecting beyond the outer end of said last mentioned counterbore, said spring means including a compression spring disposed about said shank and between the confronting surfaces of said diametrically enlarged end portion and said sleeve, a pair of friction washers disposed about said shank and between the remote ends of said compression spring and said sleeve and diametrically enlarged end portion.

2. A diamond tool comprising a sleeve adapted to be rigidly secured within a holder, an axial bore formed through said sleeve having an inwardly tapered counterbore at one end, an elongated cutting tool having a diametrically enlarged head end portion and a cylindrical shank end portion at the other end, a conical bearing intermediate portion tapering toward said shank end portion and disposed between the latter and said head end portion, said shank portion rotatably received in said axial bore with said conical bearing portion seated in said counterbore, a centrally disposed cutting tool carried at the end of said head portion remote from said shank portion, and means interconnected between said sleeve and cutting tool resiliently urging said intermediate portion into tight frictional engagement with said counterbore said urging means including spring means secured between the end of said shank portion remote from said head portion and the end of said sleeve remote from said tapered counterbore, a diametrically enlarged end portion on said shank remote from said intermediate portion, a counterbore formed in said end of said axial bore remote from said tapered counterbore, said spring means disposed in said second mentioned counterbore, said diametrically enlarged end portion projecting beyond said last mentioned end of said counterbore, said spring means including a compression spring disposed about said shank and between the confronting surfaces of said diametrically enlarged end portion and said sleeve, a centrally disposed inwardly tapering shallow recess formed in the outer end surface of said diametrically enlarged end portion.

3. The combination of claim 2 including means on the head end portion of said cutting tool adapted for engagement by an implement for effecting rotation of said cutting tool.

4. A diamond tool comprising a sleeve adapted to be rigidly secured within a holder, an axial bore formed through said sleeve having an inwardly tapered counterbore at one end, an elongated cutting tool having a diametrically enlarged head end portion and a cylindrical shank end portion at the other end, a conical bearing intermediate portion tapering toward said shank end portion and disposed between the latter and said head end portion, said shank portion rotatably received in said axial bore with said conical bearing portion seated in said counterbore, a centrally disposed cutting tool carried at the end of said head portion remote from said shank portion, and means interconnected between said sleeve and cutting tool resiliently urging said intermediate portion into tight frictional engagement with said counterbore, a counterbore formed in said end of said axial bore remote from said tapered counterbore, said spring means disposed in said second mentioned counterbore, said spring means including a compression spring disposed about said shank and between the confronting surfaces of said diametrically enlarged end portion and said sleeve, a centrally disposed inwardly tapering shallow recess formed in the outer end surface of said diametrically enlarged end portion.

References Cited in the file of this patent

UNITED STATES PATENTS

| | | |
|---|---|---|
| 2,390,967 | Swenson | Dec. 11, 1945 |
| 2,587,132 | Finke | Feb. 26, 1952 |
| 2,741,240 | Kartsher | Apr. 11, 1956 |
| 2,888,005 | Coeke et al. | May 26, 1959 |